G. F. DERMENT.
AUTOMOBILE LIFTING JACK.
APPLICATION FILED DEC. 1, 1916.

1,233,322.

Patented July 17, 1917.
3 SHEETS—SHEET 1.

Inventor
G. F. DERMENT

By
Attorney

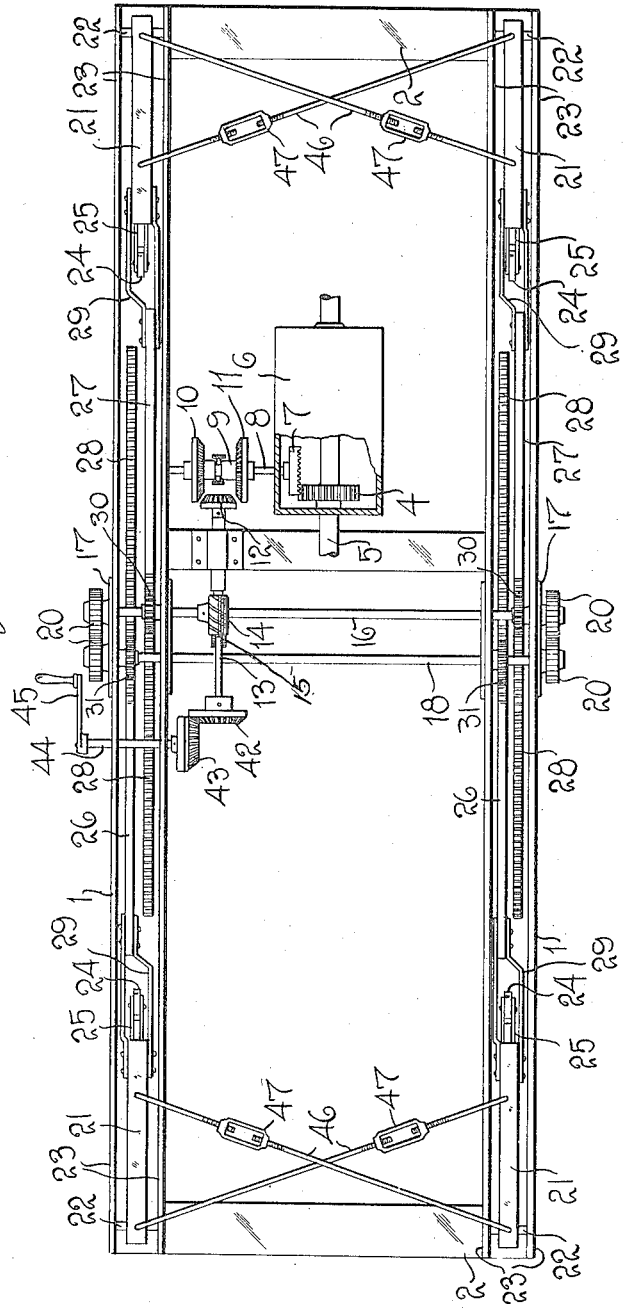

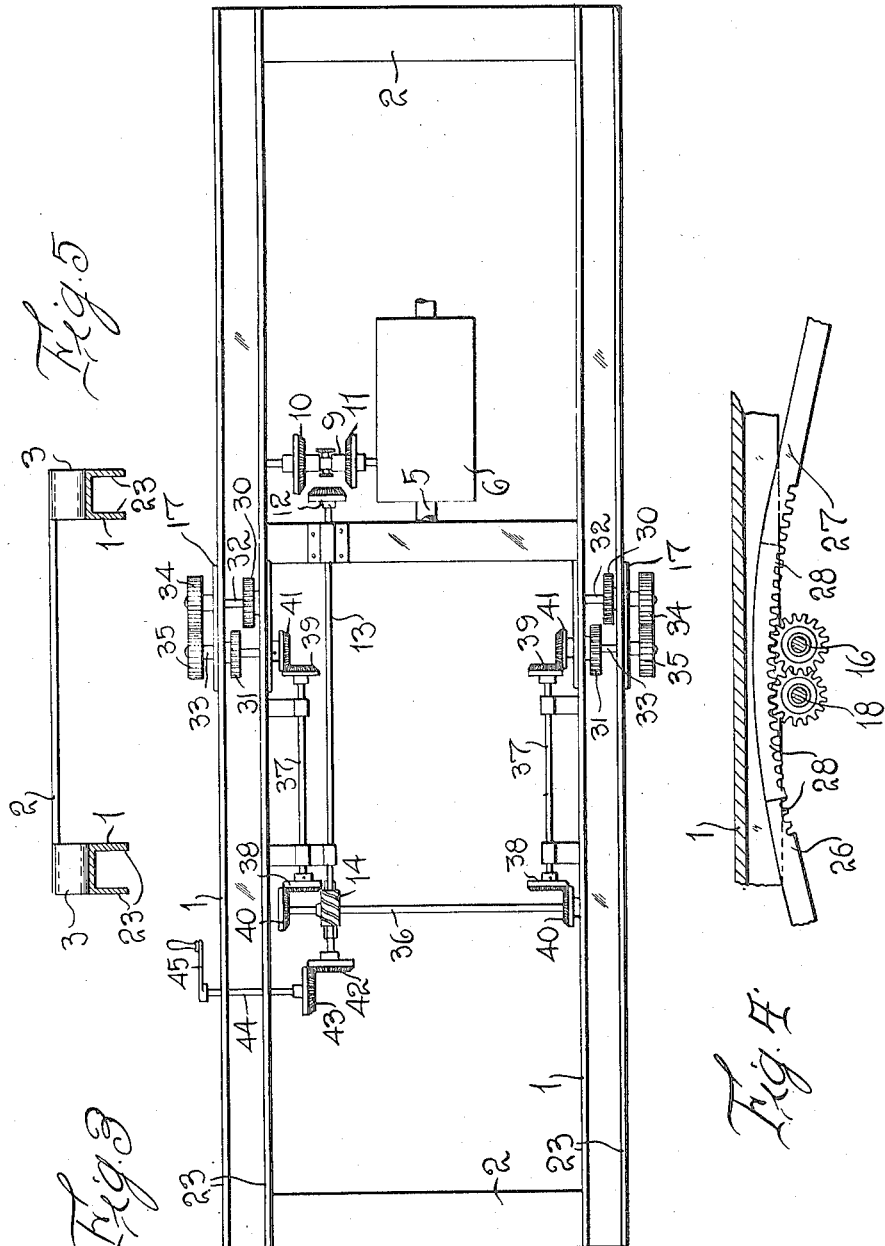

UNITED STATES PATENT OFFICE.

GEORGE F. DERMENT, OF CENTRALIA, ILLINOIS.

AUTOMOBILE LIFTING-JACK.

1,233,322.  Specification of Letters Patent. Patented July 17, 1917.

Application filed December 1, 1916. Serial No. 134,316.

*To all whom it may concern:*

Be it known that I, G. F. DERMENT, a citizen of the United States, residing at Centralia, in the county of Marion and State of Illinois, have invented certain new and useful Improvements in Automobile Lifting-Jacks, of which the following is a specification.

This invention relates to new and useful improvements in automobile lifting jacks and has for its object to provide a device of this character which may be permanently attached or applied to a car and operated by the engine through the medium of suitable mechanism geared therewith or by hand.

With the foregoing and other objects in view, the invention consists in the novel features of construction, combination and arrangement of parts illustrated in the drawings and more particularly pointed out in the appended claims.

In the accompanying drawings:—

Fig. 2 is a bottom plan view of the lifting jack.

Fig. 3 is a similar view, showing a different arrangement of the rack operating mechanism.

Fig. 4 is a detail fragmentary view, showing how the ends of the rack bars are curved upwardly and Fig. 5 is a detail cross sectional view of the lifting jack frame, taken on line 5—5 of Fig. 1.

Figure 1:
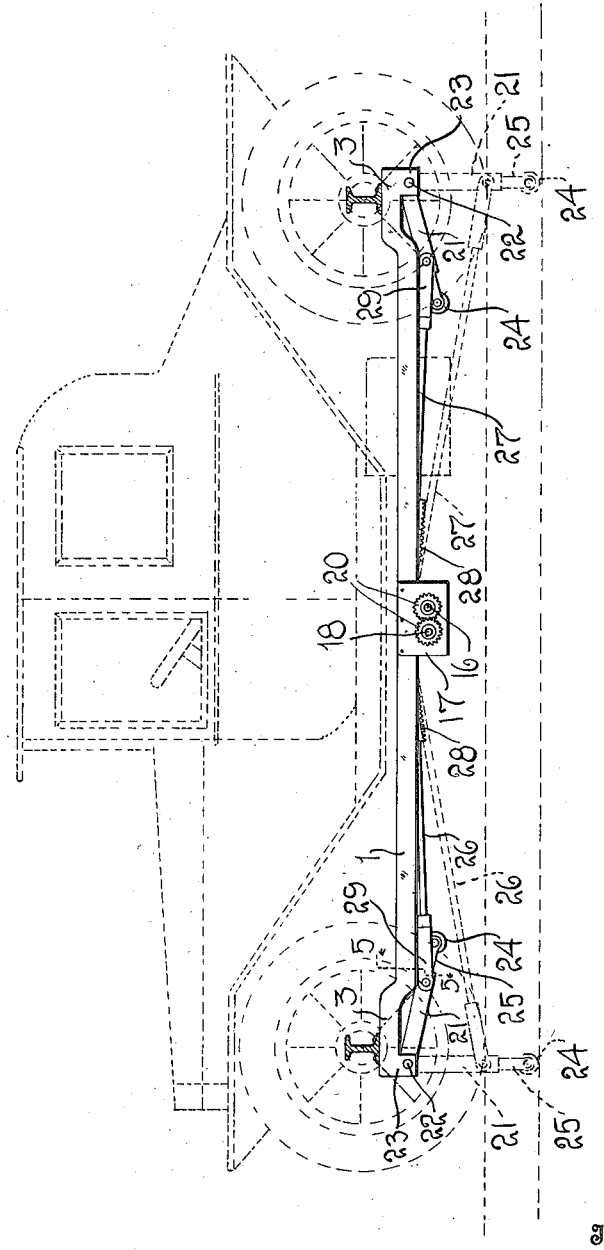
Figure 1 is a side elevation, illustrating the application of my invention, the dotted lines indicating the lowered or operative position of the supporting legs.

Referring to the drawings for a more particular description of the invention, the frame of the device comprising the side members 1, of channel iron, and the cross bars 2 at opposite ends thereof. The side members 1 may be perfectly straight throughout their entire length or formed at opposite ends with the raised or offset portions 3, as shown in Figs. 1 and 5.

In carrying out the invention, a gear 4 is applied to the engine shaft 5, which passes through the transmission gear box 6 as usual, said gear 4 intermeshing with the crown gear 7, carried by the inner end of the transverse stub shaft 8 to which is slidably keyed the sleeve 9 equipped at opposite ends with the bevel gears 10 and 11, either of which is adapted to engage a bevel gear 12, arranged at the rear end of the horizontal longitudinally disposed shaft 13. Shaft 13 is provided, intermediate its ends, with the worm 14 which intermeshes with a worm gear 15 of the transverse shaft 16 mounted at opposite ends in the bearings 17. A second transverse shaft 18 is also mounted at its opposite ends in said bearings 17 and is intergeared with the shaft 16, which is accomplished by providing each of said shafts at both ends with a pinion or gear wheel 20.

Suitable supporting and lifting legs 21 are pivoted at their upper ends, as at 22, to the front and rear ends of the side members 1 of the frame, between the side members 23 thereof, and are provided at their free ends with the rollers 24 carried by the adjustable rod sections 25 which have a screw threaded engagement with the legs to provide for shortening or lengthening the latter as required for different size wheels. The device further comprises the longitudinal rack bars 26 and 27 which work between the side members of the frame bars 1, said bars being provided with the upwardly curved toothed inner end portions 28 and at their front and rear ends, respectively, with the stirrups 29 whereby the rack bars are operatively connected with the lower ends of the legs 21.

When the driver or operator wishes to use the lifting jack to raise the vehicle, the sleeve 9 is shifted by a suitable operating lever (not shown) to throw the bevel gear into mesh or engagement with the bevel gear 12 at the rear end of shaft 13. The shaft 13 being thus set into motion, causes the shafts 16 and 18 to slowly rotate and move or project the rack bars 26 and 27 to the front and rear, respectively, and thus lower the supporting legs 21, it being obvious that after the rollers at the lower ends of the legs come into contact with the road or other surface, the automobile or other vehicle will be lifted bodily in a vertical plane. The shaft 16 is provided with the pinions 30 and the shaft 18 with the pinions 31 which engage the rack bars 27 and 26, respectively.

The arrangement of the shafts 16 and 18 shown in Figs. 1 and 2, may interfere with some of the mechanism that may be encountered in some makes of cars, and in order to avoid or obviate this objection, the operating mechanism may be arranged as shown in Fig. 3 of the drawings. In this form of the device, two stub shafts 32, arranged at opposite sides of the frame, are substituted for the shaft 16, while a second set of stub shafts 33 are also arranged at opposite sides of the frame in front of the shafts 32, the latter being intergeared with the former, as shown, through the medium of the pinions 34 and 35. Also it will be observed that the shaft 13 extends farther to the front and has a worm and gear connection at its front end with a transverse shaft 36. Two oppositely disposed longitudinal shafts 37 are arranged at opposite sides of the frame between the stub shafts 33 and shaft 36 and are equipped at opposite ends with the bevel gears 38 and 39 which intermesh with corresponding gears 40 and 41 carried by the shafts 36 and 33, respectively.

Regardless of which form of operating mechanism is used, the front end of the shaft 13 is provided with a bevel gear 42 which intermeshes with a corresponding gear 43 carried by the inner end of a short transverse shaft 44 having a bearing in the side pieces of one of the frame members 1 and provided at its outer end with a handle 45. By this means the automobile or other vehicle to which the lifting jack is applied may be raised by hand power, in case of engine trouble, or if found more convenient or desirable for any reason.

To return the supporting legs 21 into raised or inoperative position, the other bevel gear of the slidable sleeve 9 is thrown into mesh or engagement with the bevel gear 12 of shaft 13, as is apparent, which retracts the rack bars 26 and 27.

The side members 1 of the frame of the lifting jack are attached to the front and rear axle of the car at any convenient place near the wheels and said side members may be made perfectly straight, as shown in Figs. 2 and 3, or with the offset end portions 3, where it is necessary to allow for the truss rod steering rods which would otherwise interfere with the same.

The supporting legs 21 at the front and also at the rear are braced by means of the diagonal brace rods 46 and turn buckles 47, each pair or set of brace rods crossing at their center and secured at their ends to the supporting legs.

From the foregoing description, taken in connection with the drawings, it is thought that the construction and operation of this invention will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new and desired to secure by Letters Patent, is:—

1. An automobile lifting jack comprising a horizontal frame adapted to be attached to the front and rear axles of an automobile and including side members of channel iron, lifting legs pivoted at their upper ends to the front and rear ends of said side members and provided at their lower ends with rollers, longitudinally disposed rack bars working in said channel iron side members and loosely connected at their front and rear ends with the lifting legs, and suitable mechanism adapted to be operated either by the engine shaft or by hand power and comprising pinions engaging the teeth of the rack bars for projecting or retracting the latter to lower or raise the lifting legs.

2. An automobile lifting jack embracing a horizontal frame comprising side members of channel iron adapted to be attached to the front and rear axles of the car, lifting legs pivoted at their upper ends to the front and rear ends of said side members and provided at their lower ends with adjustable roller equipped sections, longitudinal rack bars working in said channel side members and loosely connected at their front and rear ends with the lifting legs, said rack bars having upwardly curved inner end portions, and suitable mechanism adapted to be operated or set into motion either by the engine shaft or by hand power and comprising pinions engaging the teeth of said rack bars for projecting or retracting the latter to lower or raise the lifting legs.

In testimony whereof I affix my signature in the presence of a witness.

GEORGE F. DERMENT.

Witness:
BEN M. PRICE.